United States Patent [19]

Lai

[11] Patent Number: 4,897,677
[45] Date of Patent: Jan. 30, 1990

[54] MULTICOLORED PRINTING METHOD AND DEVICE

[75] Inventor: Kou-Yen Lai, Taiwan, Taiwan

[73] Assignee: Industrial Technology Research Institute, Taiwan, Taiwan

[21] Appl. No.: 165,655

[22] Filed: Mar. 8, 1988

[51] Int. Cl.[4] .................. G01D 15/06; G01D 15/20; B41J 3/02; B41J 3/04

[52] U.S. Cl. .................. 346/155; 346/157; 355/211; 355/326; 400/119

[58] Field of Search .......... 346/155, 157, 160, 112; 358/300, 75; 400/118, 119; 355/3 R, 4, 3 DR, 211, 210, 245, 271, 326, 327

[56] References Cited

U.S. PATENT DOCUMENTS 4,511,268 4/1985 Marshall .................. 346/160 X
4,639,749 1/1987 Ito .................. 400/119 X

FOREIGN PATENT DOCUMENTS 0077167 6/1981 Japan .................. 400/118
0192586 10/1984 Japan .................. 400/118
0083062 5/1985 Japan .................. 355/4

Primary Examiner—A. T. Grimley
Assistant Examiner—Edward Pipala
Attorney, Agent, or Firm—Darby & Darby

[57] ABSTRACT

A process and an apparatus for laser printing multicolored images are described. The printer includes means for feeding a paper sheet or other recording medium continually with predetermined pauses through a transfer zone and means for moving a recording drum across the surface of said paper sheet in a direction perpendicular to the direction of the paper feed. The recording drum has associated therewith an exposure system and a developer means for applying a latent image and toner, respectively, to said drum. The drum containing toner is rolled across the surface of the paper to effect printing during the periods when the paper feeding means pauses. An erasure means is provided to remove residual toner from the drum after the printing operation. Preferably the exposure system constitutes a plurality of zones, each capable of imaging contiguous areas of the drum and a corresponding plurality of developer zones, each positioned to apply toner to one of the discrete areas of said drum. Optimally, four separate zones are provided in the exposure system and developer means, each to apply a different color (e.g., red, yellow, blue and black), thereby enabling the printer to produce full color prints.

8 Claims, 4 Drawing Sheets

MULTICOLORED PRINTING METHOD AND DEVICE

BACKGROUND OF THE INVENTION

Because of their high speed and flexibility, electrophotographic or laser beam printers are becoming increasingly popular. While this technology has reached a high state of perfection in connection with black and white printing, where it is desired to form multicolored prints many problems remain. A typical example of the state of the art multicolor printers is described in the Hitachi U.S. Pat. No. 4,467,334. To produce the multicolored images, the surface of the photosensitive drum is scanned with a plurality of laser beams sequentially with the toner being applied immediately after the latent image for a particular color is formed on the drum surface.

The foregoing apparatus and method has two major drawbacks. Firstly, the surface to which the first toner color has been applied subsequently passes by the developers wherein the second and third color toners are contained. Because the toner applied to the drum is held by relatively weak electrostatic forces, some of the toner leaves the surface of the drum and contaminates the subsequent developers, thereby altering the desired color balance. The second drawback of the device shown in the Hitachi patent is that the paper upon which the image is printed can be no wider than the photosensitive drum since the drum rolls along the surface of the paper sheet in the same direction of the sheet. Obviously, this limits the application of such printers to comparatively small reproductions, unless extremely costly and very large drums are employed.

BRIEF DESCRIPTION OF THE INVENTION

In accordance with the invention, a new printer and a method of printing have been devised whereby the paper sheet to be imaged is moved in a first direction in predetermined incremental steps, pauses, and moves once again until the entire image is transferred to the paper. The rotating drum, rather than rolling in a direction parallel to the direction of the paper movement, transfers the image from its surface by moving perpendicularly to the direction of motion of the paper during the periods the paper is not moving. It will be readily understood that, since the transfer process takes place while rolling the drum perpendicularly to the paper, there is no limit on the width of the paper which can be imaged. Conventional size drums can be used without limiting the size of the resultant reproduction.

In a further embodiment of the invention, the multicolored image is formed by applying each color to a discrete area of the photosensitive drum. For example, if four-colored printing is desired, each pixel is divided into four quadrants, each quadrant being contiguous but not overlapping. To avoid contamination, each quadrant is exposed only with respect to its particular color and the appropriate toner applied only to the latent image on the corresponding quadrant. This procedure results in precise control throughout the printing cycle.

DETAILED DESCRIPTION OF THE INVENTION

Figure 1:
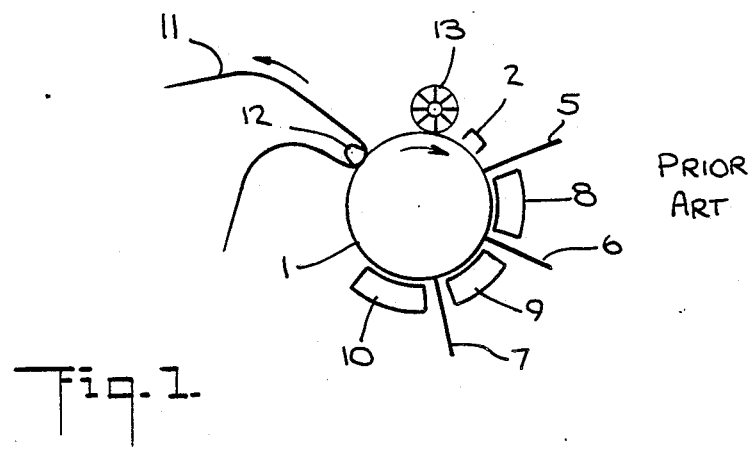
FIG. 1 represents a schematic diagram of the apparatus employed in the Hitachi U.S. Pat. No. 4,467,334.

FIG. 1 shows schematically the application of toner to a photosensitive drum 1 and the transfer of the resultant image to a paper sheet 11. Three sets of developer units 8, 9 and 10 are sequentially arranged adjacent to the drum surface as indicated. Each of the three units is filled with a specific color toner. An exposure system (not shown) is provided to regulate the brightness of the light beams 5, 6 and 7 reflected on the recording drum 1. These produce an electrostatic latent image on the drum. This latent image absorbs the colored toners onto the surface of the drum 1 and which prints the image on the paper 11 by means of the transfer unit 12. The cleaner 13 removes any residual toner particles from the drum. The corona charger 2 uniformly charges the surface of the drum.

The difficulty with the foregoing apparatus is that the rotating drum 1 absorbs the color toner from the developer unit 8 and then rotates to absorb the other colors from units 9 and 10. As the process continues, the color toner from the first units tends to mix with the toner in the subsequent developer units, resulting in contamination of the color and the deterioration of the printing quality. This problem is intrinsic in the design and is essentially unavoidable. Additionally, the width of the sheet which can be printed is limited by the width of the recording drum; obviously, nothing wider than the recording drum can be printed. This makes it particularly cumbersome where it is desired to print large sheets, and makes it practically impossible to develop portable printers. A still further problem is that the use of wider recording drums requires a much more complex and exacting manufacturing technique to produce the necessary large area smooth surface. Naturally, this is costly. If one could adopt narrower drums for printing on wide sheets, simpler manufacturing procedures could be used to fabricate the drums.

Figure 2:
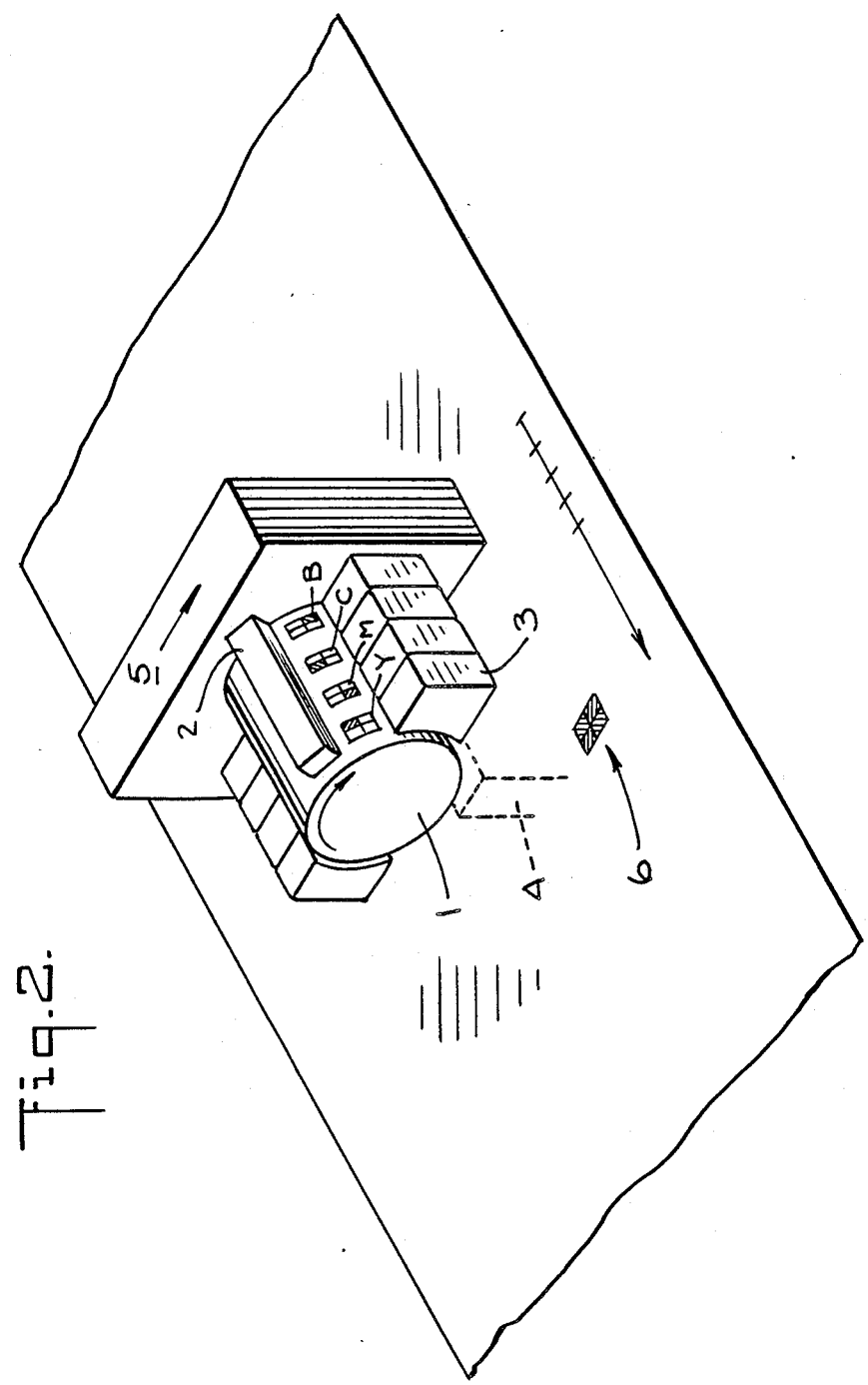
FIG. 2 shows the print head used in the instant invention, with particular emphasis on the coloring system.

FIG. 2 shows the application of the invention to a four-color process. Three of the colors (red, yellow and blue) can form all colors except black; black is, therefore, used as the fourth color. The arrow on the paper sheet illustrates the direction of movement of the paper, with the crosslines on the arrow indicating the distance the paper progresses in each step. The numeral 1 illustrates the photosensitive drum, numeral 2 the exposure mechanism, numeral 3 the developer system, and numeral 4 a platen positioned on the underside of the paper sheet opposite the contacting surface of the rotating drum. The clockwise arrow on the drum 1 depicts the direction of its rotation, and the arrow on the block 5 the direction of movement of the print head which is perpendicular to the direction of the paper sheet. This motion of the print head and drum takes place only at such time as the paper pauses. Platen 4 moves in fixed relationship with the print head beneath the lower surface of the paper sheet. Of particular interest in FIG. 2 are the four rectangles (pixels) shown on the drum in the position intermediate to the exposure means 2 and the developer zones 3. On the paper sheet as represented by the numeral 6 is an enlarged picture of a single pixel divided into four quadrants.

During the printing process, the exposure zone directs a discrete laser beam to each particular quadrant shown by the crosshatched areas. The latent image in each quadrant is separately treated with toner by one of the four developer units which form part of the developer system 3.

It will be understood that, to fill all four quadrants of a particular pixel, seven passes of the print head, each after the paper is advanced incrementally, are required. Since the toner is completely erased from the drum after the printing cycle, contamination is minimized.

Figure 3:
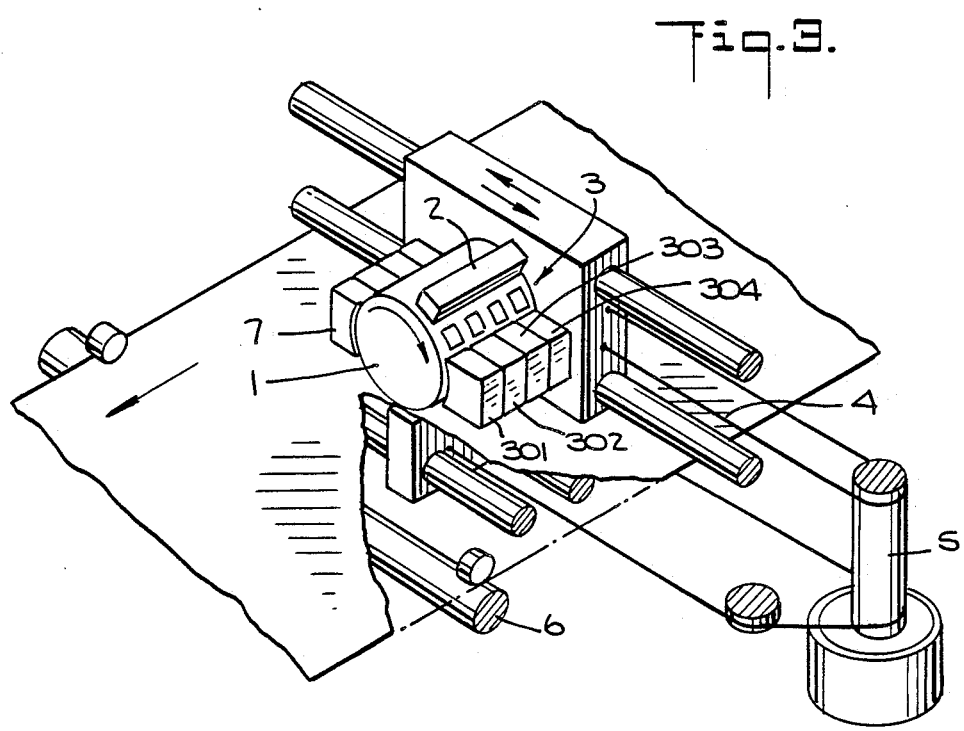
FIG. 3 illustrates the apparatus of the instant invention, showing all of the major components.

FIG. 3 shows schematically the major operating units of the invention. A paper sheet is advanced incrementally by the drive means 6. Selection of a motor to drive the paper the predetermined amount in a stepwise fashion can be readily selected by those skilled in the art. The print head comprises the rotary photosensitive drum 1, the exposure unit 2, the development system 3 (which comprises four discrete zones 301, 302, 303, 304, each provided with toner of a different color and each separated by a blank area) and the erasure unit 7. The print head assembly moves perpendicularly to the direction of motion of the paper in a reciprocal manner as shown by the arrows atop the printer assembly. This motion is imparted by the lines 4 attached to the drive means 5. The platen beneath the paper is similarly driven by the drive means 5 so that the platen remains beneath the contact surface of the drum 1 in the transfer zone (i.e., where the drum contacts the paper surface and transfers the toner).

To describe the operation of the apparatus, the direction of the paper perpendicular to its direction of motion shall be referred to as the horizontal, and the direction of the paper parallel to the direction of motion as the vertical. When the motion of the paper stops, the drive means 5 moves the drum 1 across the surface of the paper to form a series of horizontal lines.

The electrophotographic process is initiated by neutralizing discrete areas on the surface of the rotating drum by means of four discrete laser beams axially located in the zone 2. The activation of the laser beams necessary to neutralize the appropriate portion of the surface of a positively charged drum is well known to those skilled in the art. The drum having the latent image thereon rotates by the developer system 3 and positively charged fine powder toner from the four zones 301 through 304 is deposited on each of the separately imaged areas. As the drum continues to roll, the toner adhering to the drum is transferred to the negatively charged paper by pressure applied to the paper by the rotating drum and platen to form horizontal lines. Residual toner remaining on the drum surface after transfer to the paper is removed by the cleaner 7 and the process continued. The toner is fused to the paper by a combination of heat and pressure.

Figure 4:
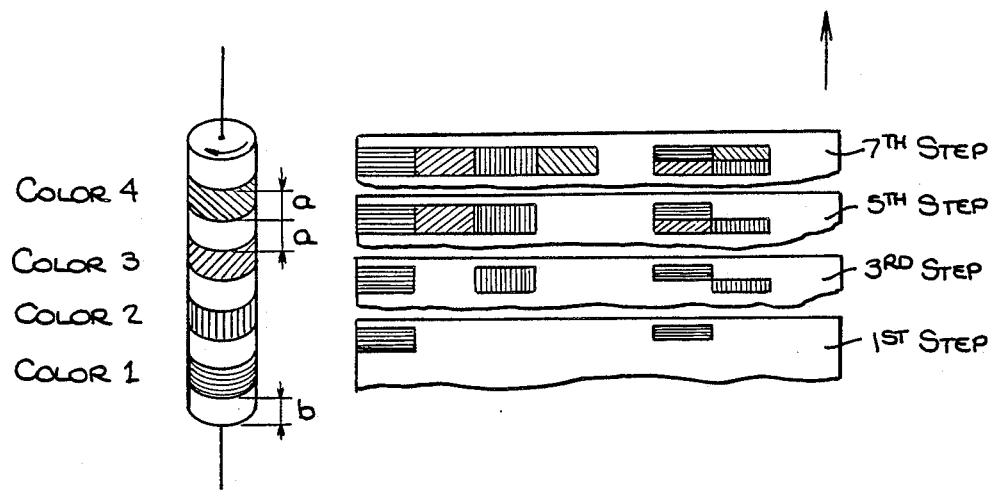
FIG. 4 represents an isometric view of the drum used in the invention and the application of four different colors to the recording media after the first, third, fifth and seventh steps of the process.
Figure 5:
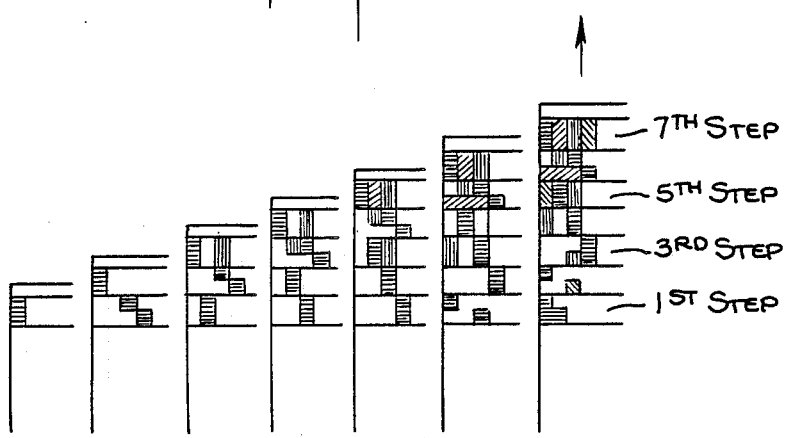
FIG. 5 shows by means of overlays the sequential stepwise movement of the paper after several passes of the printing drum.

FIGS. 4 and 5 show the application of four colors to the recording medium after the first, third, fifth and seventh steps of the process. Different crosshatching is used to represent the four different colors of the process. On the drum, each of the four areas is separated by a discrete blank area to avoid contamination between the colors. As shown by the symbol "a", the width of the color bands is equal to the width of the blank areas. Blank areas are also provided at the two ends of the drum shown by the letter "b". These may be of variable width. The arrow shows the direction of rotation of the drum. The rotating drum moves perpendicularly to the direction of movement of the paper. It will be understood that the drum rolls over the paper only at such time as the paper pauses. After each pass of the drum, one step in the process, the paper is advanced an incremental amount corresponding to the distance "a".

As will be seen, after the first step, color 1 is applied to a particular horizontal line of the paper; the paper is incremented, the drum is again passed over the surface of the paper sheet in a second step, but no color is applied to this particular horizontal line; thereafter, the paper is incremented a third time, color 2 applied; and after the fifth and seventh increments, colors 3 and 4 are applied, respectively, to complete the color across the particular horizontal line of the paper.

Whereas FIG. 4 focusses on the printing of a single horizontal line, FIG. 5 shows by means of overlays that in fact all four colors may be applied in a single pass to alternate horizontal lines on the paper. Accordingly, upon completion of the seventh step, seven horizontal lines, the topmost colored in whole and the others colored in part, are formed.

The dimensions of the drum such as the diameter, length and width of the discrete areas, may be readily selected by those skilled in the art depending on the printing speed, size of the recording medium, and printing quality required. These may be readily determined by those skilled in the art. The speed of the drum roll across the paper depends on both the sensitivity and photoconductivity of the drum and the sophistication of the exposure mechanism. To this extent, the method of operation is comparable to other laser and electrostatic printers.

FIG. 6 shows the motion of the print head with respect to the paper 5 during each pass of the drum. The exposure mechanism is represented by the numeral 1, the developer unit by the numeral 2, the cleaner by the numeral 3, and the corona charger by the numeral 4. The FIG. 6(a) shows that at the beginning of the operation the rotating drum is positioned beyond and above the edge of the paper 5. At this time the paper 5 is moving incrementally. FIG. 6(b) shows the beginning of the printing process. The sheet 5 is now stationary and the drum dropped vertically and advanced horizontally into contact with the leading edge of the paper. FIG. 6(c) shows the drum passing over the surface of the paper sheet after it passes the checkpoint 6. This checkpoint acts as a motor speed controller and assures that the drum reaches the proper speed of rotation before it comes into contact with the surface of the paper.

Figure 6A:
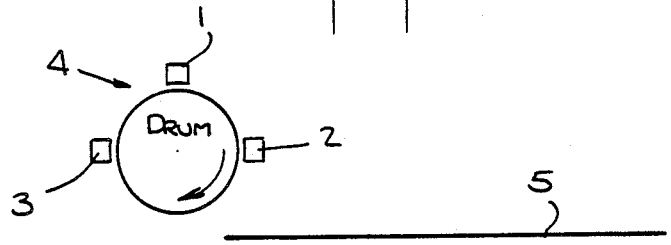
FIG. 6 shows a side view of the print head and the recording medium in relationship to one another through four steps of the printing process.
Figure 6B:
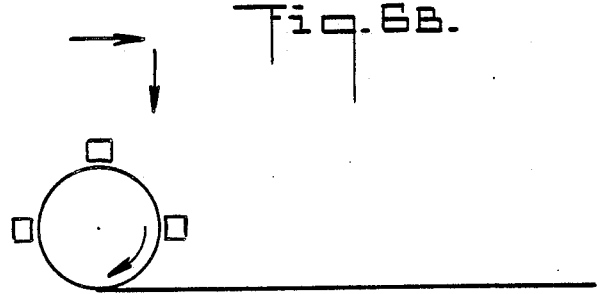
Figure 6C:
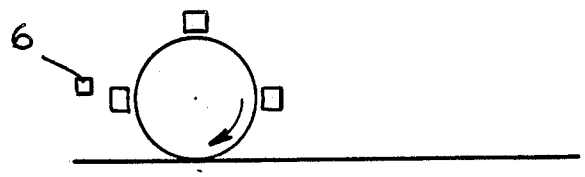
Figure 6D:
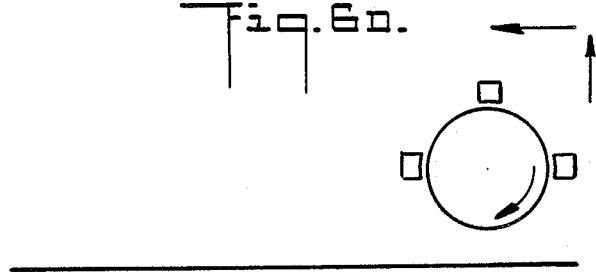

At this time four spaced horizontal lines, each of a different color, may be formed on the sheet. FIG. 6(d) shows the position of the drum after the completion of the pass. The drum rises and returns to the initial position shown in FIG. 6(a). After the paper sheet is advanced one unit, the steps are repeated until all of the data is printed.

What is claimed is:

1. An electrophotographic printer which comprises:
 i. a printer head including a photosensitive rotating drum and fixed exposure means and developer means, each positioned at the circumference of said drum and each comprising four zones axially spaced along the circumference of said drum, each of said exposure zones being capable of forming a latent image on a discrete area of the drum, and each of said developer zones adapted to deposit toner on one of said discrete areas, the discrete areas so formed forming the quadrants of a quadrilateral area;

ii. a transport means for moving a paper sheet in a first direction in predetermined incremental amounts, each after a defined pause, through an image transfer zone;

iii. a printer head drive means for rolling said drum of said printer head perpendicular to said first direction across said paper sheet through said image transfer zone; and iv. control means for activating the printer head drive means so that said drum rolls through said image transfer zone during a defined pause, so as to be able to transfer the image on said drum to said paper sheet.

2. A method of making a multicolor print on a paper sheet transportable in a first direction by means of a rotating drum moving over the surface of said paper sheet in a second direction perpendicular to said first direction, said rotating drum having a plurality of circumferential spaced discrete bands each of substantially equal width and each selectively coated with an electrostatically adhered toner of a distinctive color, which comprises:

(a) rolling said drum across the surface of said paper sheet in said second direction while said paper is stationary;

(b) transferring the toner from each of said bands to form a plurality of spaced broken and/or solid lines, each of a different color, in said second direction;

(c) removing said drum from contact with said paper sheet;

(d) incrementally advancing said paper in said first direction in an amount substantially equal to the width of a band on said drum;

(e) repeating said steps (a) to (d) to form a plurality of broken and/or solid lines, each of a different color, in said second direction in the spaces between the lines formed in step (b) above;

(f) repeating step (a) so as to transfer a second color along at least one of the lines formed in step (b) so as to form at least one multicolored line; and (g) repeating said steps (a) to (f) to form a plurality of multicolored lines which comprise said multicolor print.

3. The method of claim 2 wherein said rotating drum has at least three bands, each having adhered thereto a distinct color.

4. The method of claim 2 wherein each band is separated by a blank zone so as to ensure the separation of each distinct color toner.

5. The method of claim 2 wherein the toner is applied to said rotating drum by means of separate developer units adjacent to each of said bands and the toner deposited on an electrostatic latent image on the surface of each of said bands.

6. An electrophotographic printer which comprises:

i. a printer head including a photosensitive rotating drum and fixed exposure means and developer means, each positioned at the circumference of said drum and each comprising a plurality of zones axially spaced along the circumference of said drum, each of said exposure zones being capable of forming a latent image on a discrete area of the drum, and each of said developer zones adapted to deposit toner on one of said discrete areas;

ii. a transport means for moving a paper sheet in a first direction in predetermined incremental amounts, each after a defined pause, through an image transfer zone;

iii. a printer head drive means for rolling said drum of said printer head perpendicular to said first direction across said paper sheet through said image transfer zone; and iv. control means for activating the printer head drive means so that said drum rolls through said image transfer zone during a defined pause, so as to be able to transfer the image on said drum to said paper sheet;

each of said developer zones being separated by a blank area.

7. The electrophotographic printer of claim 6 wherein a platen is conveyed along the underside of the paper sheet in the transfer zone in timed relation with the printed head to facilitate the transfer of the image from the drum to the paper sheet.

8. An electrophotographic printer which comprises:

i. a printer head including a photosensitive rotating drum and fixed exposure means and developer means, each positioned at the circumference of said drum and each comprising a plurality of zones axially spaced along the circumference of said drum, each of said exposure zones being capable of forming a latent image on a discrete area of the drum, and each of said developer zones adapted to deposit toner on one of said discrete areas;

ii. a transport means for moving a paper sheet in a first direction in predetermined incremental amounts, each after a defined pause, through an image transfer zone;

iii. a printer head drive means for rolling said drum of said printer head perpendicular to said first direction across said paper sheet through said image transfer zone; and iv. control means for activating the printer head drive means so that said drum rolls through said image transfer zone during a defined pause, so as to be able to transfer the image on said drum to said paper sheet;

each of said discrete areas on the drum being separated by a blank area to ensure the separation of toner to be deposited on each of said discrete areas.

* * * * *